United States Patent [19]

Haraikawa et al.

[11] 3,881,576
[45] May 6, 1975

[54] DISK BRAKE UNIT CALIPER MOUNTING

[75] Inventors: Tetsuo Haraikawa, Funabashi; Yasuo Karasudani, Yokohama, both of Japan

[73] Assignee: Tokico Limited, Kawasaki, Japan

[22] Filed: Sept. 25, 1973

[21] Appl. No.: 400,607

Related U.S. Application Data

[63] Continuation-in-part of Ser. No. 189,108, Oct. 14, 1971, abandoned.

[30] Foreign Application Priority Data

Oct. 14, 1970  Japan.............................. 45-90226

[52] U.S. Cl................................ 188/73.5; 188/73.3
[51] Int. Cl............................................. F16d 65/00
[58] Field of Search ........ 188/73.3, 72.4, 72.5, 73.5

[56] References Cited
UNITED STATES PATENTS

| | | | |
|---|---|---|---|
| 3,194,351 | 7/1965 | Swift | 188/72.4 |
| 3,375,906 | 4/1968 | Hayes | 188/73.3 |
| 3,388,774 | 6/1968 | Burnett | 188/73.5 |
| 3,500,967 | 3/1970 | Nolan | 188/72.4 |
| 3,656,590 | 4/1972 | Newstead | 188/73.4 |

FOREIGN PATENTS OR APPLICATIONS

1,079,911  8/1967  United Kingdom............... 188/73.3

*Primary Examiner*—George E. A. Halvosa
*Attorney, Agent, or Firm*—Sughrue, Rothwell, Mion, Zinn & Macpeak

[57] ABSTRACT

The invention relates to a hydraulically operated disk type vehicle wheel brake unit.

The improvement comprises the provision of a high viscosity liquid damper provided on tie bolts extending between the legs of a caliper movable relative to the rotatable brake disk as well as a stationary support member for the caliper and fixedly attached to the chassis of the vehicle, for suppressing disadvantageous vibration of the caliper appearing during the braking or the like period, while effectively allowing the relatively slow sliding movement of the caliper necessary for performing the braking function.

5 Claims, 8 Drawing Figures

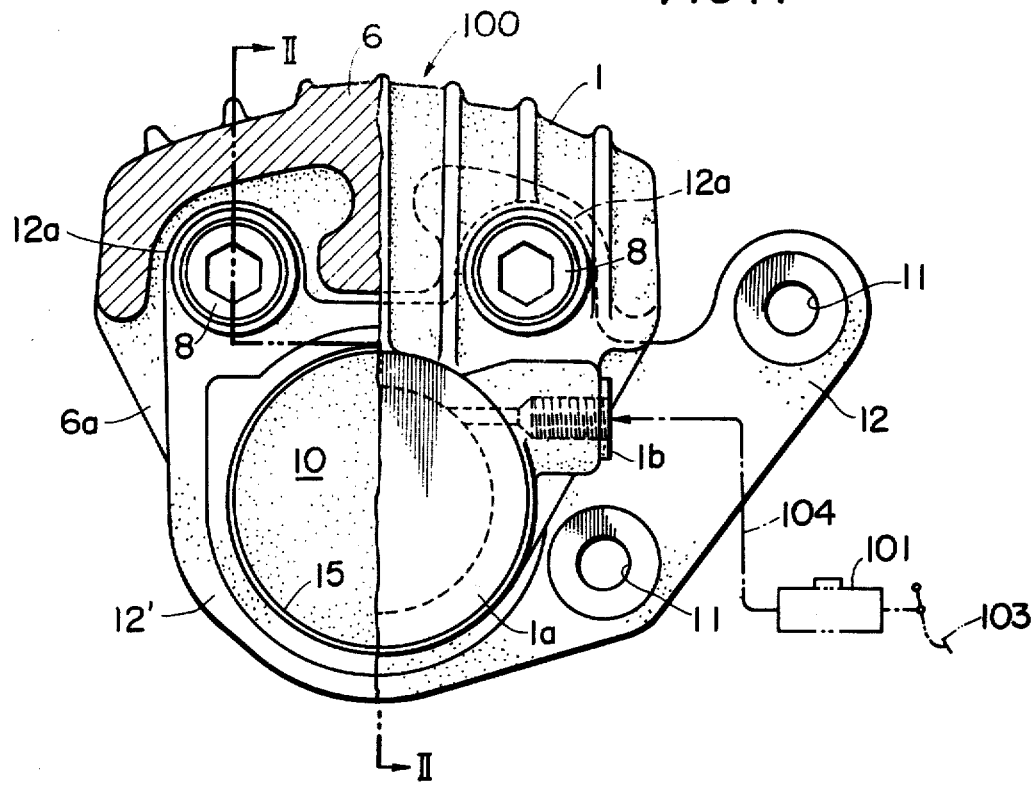
FIG. 1
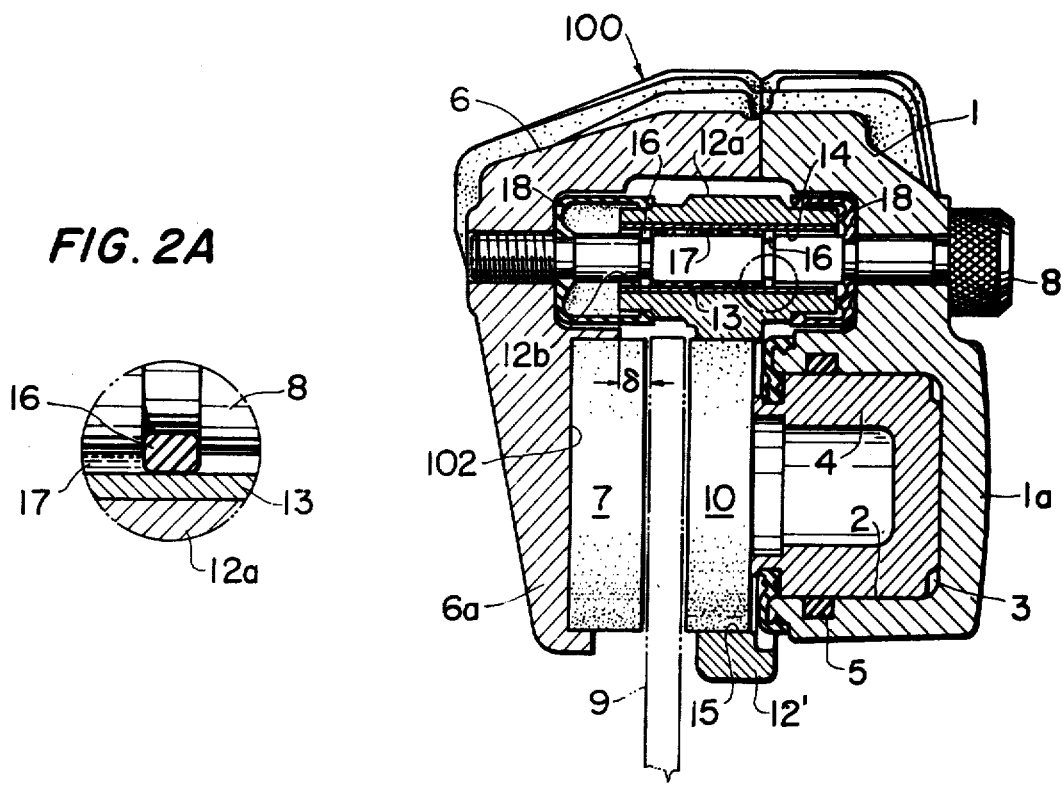
FIG. 2
FIG. 2A

DISK BRAKE UNIT CALIPER MOUNTING

CROSS-REFERENCE TO RELATED APPLICATION

This application is a continuation-in-part application of our earlier co-pending application Ser. No. 189,108 filed Oct. 14, 1971 by the same inventors, which is now abandoned.

This invention relates to a hydraulically operated disk type vehicle wheel brake unit. More specifically, it relates to such type of wheel brake unit wherein clamping means such as caliper is movably mounted axially of a brake disk rotatable in unison with a vehicle wheel to be braked and on a stationary supporting or mounting member which is fixedly attached to the chassis of the vehicle.

A main object is to provide an improved brake unit of the above kind which is capable of effectively damping the unavoidable and disadvantageous axial vibration and sliding movements of the clamping means such as caliper, while allowing effective relative movement thereof for performing the necessary braking action.

A further object is to provide an improved disk brake unit having its tie bolts substantially completely housed in the unit for avoiding damages by flying stones or the like.

A still further object is to provide an improved disk brake unit of small sized and compact nature.

These and further objects, features and advantages of the invention will become more apparent as the description proceeds by reference to the accompanying drawings.

In the drawings:

FIG. 1 is a schematic elevational view of a first embodiment of the improved brake unit according to this invention wherein, however, the left-half represents inner parts by removal of a caliper component from the assembly.

FIG. 2 is a sectional view taken substantially along a sectional plane X—X shown in FIG. 1.

FIG. 2A is an enlarged view of a part of FIG. 2.

Figure 3:
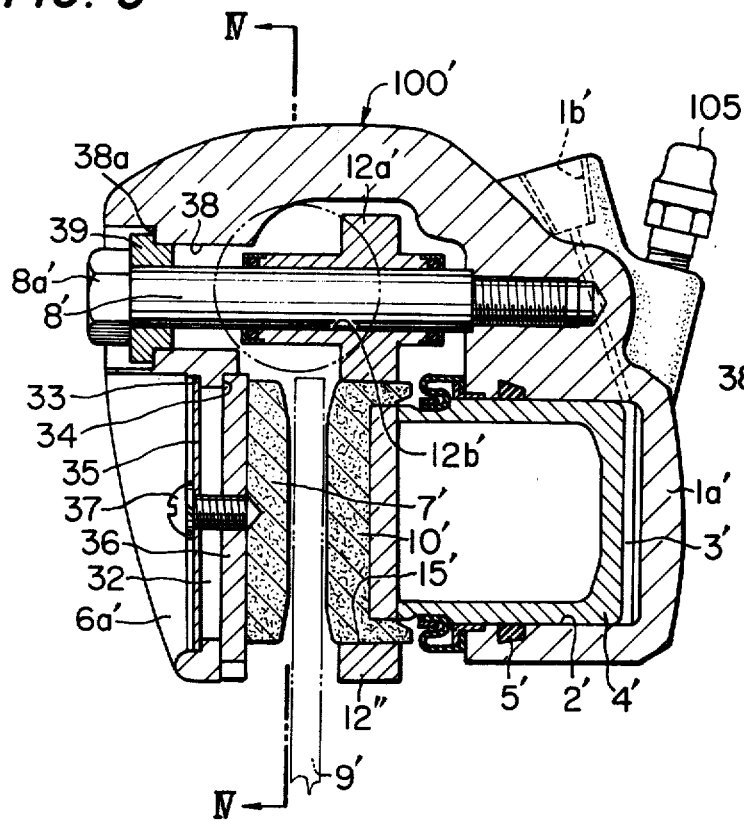
FIG. 3 is similar to FIG. 2, showing a second embodiment of the invention.
Figure 3A:
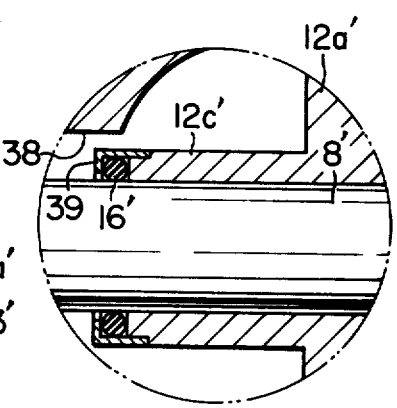
FIG. 3A is an enlarged view of a part of FIG. 3.
Figure 4:
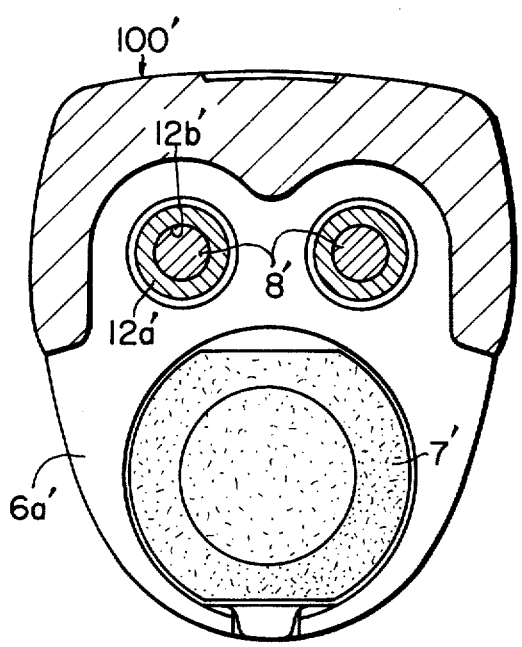
FIG. 4 is a cross-section taken substantially along a section line Y—Y shown in FIG. 3.

Referring now to the accompanying drawings, a preferred embodiment of the invention will be described in detail.

Numeral 100 denotes a conventional caliper which is slidably mounted on a certain part of a chassis of the vehicle which is fitted with the hydraulic wheel brake piston-cylinder unit, commonly known briefly as "wheel cylinder" by those skilled in the art, said slidable arrangement of the caliper being highly well known so that it has been omitted from the drawings only for simplicity.

The caliper 100 comprises two caliper components 1 and 6, of which the former component 1 is formed at its lower part 1a, frequently called "leg", with an inwardly opening cylinder bore 2 in which a cup-shaped hydraulic piston 4 is slidably received. At the right-hand end of the bore 2 and between the outer end of said piston and the corresponding cylinder end wall part of said leg 1a when seen in FIG. 2, there is formed a hydraulic chamber 3 kept in fluid communication through a connecting socket 1b with a master cylinder or the like pressure liquid source shown schematically in FIG. 1 at 101. Between the piston 4 and the cylindrical wall part of the leg 1a which defines said bore 2, a sealing ring 5 is provided as conventionally, so as to prevent any fluid leakage from the hydraulic chamber 3 towards the open atmosphere.

Second caliper component 6 is formed at its lower part 6a, frequently called leg as before, with a circuit recess 102 in which a friction pad 7 is fixedly mounted by glueing or the like conventional means, although not shown.

The caliper components 1 and 6 are combined with each other fixedly, yet detachably, by means of two separate tie bolts commonly denoted by a common reference numeral 8.

Each of the tie bolts 8 passes slidably through the longitudinal bore 14 of a bushing 13 press-fit in a corresponding bore or aperture 12b formed through an ear part 12a of main part 12' integral with an arcuated and elongated supporting arm 12 which has a substantially T-section when seen in FIG. 2 and is fixedly attached to a stationary part, not shown, of the vehicle chassis, again not shown, by means of fixing bolts inserted and screwed in position through respective bolt holes formed through the arm 12 and denoted by a common numeral 11.

Caliper means comprising said caliper components 1 and 6 has as a whole a C-shaped general configuration and is disposed in straddling relation to said main body 12' and both of said ear portions 12a, as may be well supposed from FIG. 1.

The main part 12' is formed with a circular opening 15 which receives axially slidably a second friction pad 10.

Between the both pads 7 and 10, there is provided with slight idle gaps, a brake disk 9, shown only partially and schematically, which is arranged to rotate in unison with the related one of the vehicle wheels, not shown.

When hydraulic pressure liquid, preferably pressure oil, is delivered from the master cylinder 101 by actuation of a conventional brake pedal 103 operatively connected therewith, through a piping 104 and connecting sockets 1b, only one thereof being shown, to the hydraulic chamber 3, the piston 4 is advanced leftwards in FIG. 2, so as to bring the related friction pad 10 into sliding contact with the right-hand surface of the now rotating brake disk 9, while a corresponding hydraulic reaction will be transmitted to the caliper assembly 1 to move rightwards for bringing the opposite pad 7 into sliding contact with the left-hand surface of the disk 9. In this way, a braking effort will be exerted against the related vehicle wheel, not shown, through the disk 9.

In this case, each of the tie bolts 8 serves as a sliding guide for the caliper assembly 1 relative to the ear part 12a of main part 12' of the stationary supporting arm 12. At the same time, these bolts 8 act as resisting means or tension means for the prevention of otherwise appearing separating relative movement of the caliper components 1 and 6 from each other, as may be met during the hydraulic brake force applying period. Since the centers of these bolts lie substantially on parallel lines tangent to the circular opening 15 as viewed in FIG. 1, the effective restraining force applied by these bolts lies along a central axis disposed between said tangent parallel lines.

Brake reaction developed by the application of friction pad 10 is transmitted directly to the supporting arm 12, while that developed by the application of the opposite pad 7 is transmitted only indirectly to the arm through the intermediary of a caliper assembly which constitutes a kind of clamping means or compression means. Therefore, it will be seen that a kind of a lateral bending force is applied relatively from the tie bolts to the supporting arm 12. For reducing the disadvantageous effects caused by this lateral bending moment, it is preferable to increase the overriding length of the ear part 12a over the disk 9 or more specifically to increase the distance delta shown in FIG. 2.

In order to provide a proper amount of sliding resistance to the said clamping means at the relative sliding area between said means and said supporting arm, and in addition, to prevent unavoidable and disadvantageous plays therebetween, a pair of resilient rings commonly denoted by a reference numeral 16 are mounted at an appreciable mutual distance on each of the tie bolts 8, although only a pair of the rings are shown. The diametral dimension of these resilient rings 16 is so selected that they are kept in pressurized and sealing contact with the inside wall surface of the bushing 13. It should be noted that according to the main feature of this invention, a high viscous liquid 17 such as silicon oil, preferably having a viscosity of the order of a million centistokes, is sealed off into a ring space defined by the opposing inner end surfaces of these rings 16, the related tie bolt 8 and the inside wall surface of the bushing 13. This high viscous liquid serves well for preventing otherwise possible clogging between the rings 16 and thee bushing the so as to provide an effective protection at the relatively sliding parts between the clamping means and the supporting ear 12a. By the provision of this high viscous liquid pool, the high frequency mechanical vibration and sliding movements of said clamping means relative to the supporting arm 12, being caused by the vibration of the travelling vehicle and the unavoidable eccentric rotation of the brake disk 9, can effectively be damped. On the contrary, the high viscous liquid vibration and slide damper 17 will allow slow vibrating motion of the clamping means, thus providing substantially no adverse effect upon the desired braking action.

Additionally, a resilient boot 18 is provided at each axial end of the supporting ear 12a and fixedly attached by its end to the ear and tie bolt, so as to prevent dust invasion into the relatively sliding parts under consideration.

As most clearly seen from FIG. 2, said ear portions 12a and said resilient seals 16 or more generally, the relatively sliding portions 13 and tie bolt 8 are positioned in a substantially enclosed space defined by said caliper components 1;6 and said friction pads 7;10, so as to be protected from collision by flying stones or the like rigid foreign matters.

Although in the foregoing desciption, the caliper means or assembly has two component elements, the latter may be united into one piece, as will be more specifically described in connection with the second embodiment. In this case, the tie bolts can be defined as reinforcing bolts acting as tension means against the expanding force as applied to the caliper unit during brake application period. These bolts act equally as before, as the slide guide means.

Next, referring to FIGS. 3–6, the second embodiment of the present invention will be described in detail.

In these FIGS. 3–6, reference numerals 1a', 1b', 2', 3', 4', 5', 6a', 7', 8', 9', 10', 12'', 12a', 12b', 15' and 100' represent same or similar parts as those denoted respective same reference numerals having no prime in the foregoing first embodiment and thus no analysis thereof would be necessary for better understanding of the present embodiment. In this case, however, the main part 12'' corresponds to that denoted 12' in the foregoing. As seen, in the present embodiment, the caliper means 100' has been formed into one piece.

In this second embodiment, the leg 6a is formed with a large opening 32 adapted for introducing and dismantling of the piston 4' during assemblying and overhauling job. This opening 4' is formed with outer and inner shoulders 33 and 34 for receiving snugly an attaching plate 35 and first pad 7' fitted rigidly a backup plate 36, respectively. A fixing screw 37 connects the attaching plate 35 rigidly with the first pad 7'.

At an upper part of leg 6a', the caliper 100' is formed with a horizontal bore 38 having an intermediate shoulder 38a on which abuts a centering ring 39 for supporting the head 8'a of slide guide bolt 8'. As seen, these bolts 8' are two in their number as before and lie within parallel lines tangent to the circular opening 15, as clearly seen from FIG. 4. Therefore, the effective restraining force exerted by the bolts lies on a central axis between said parallel tangent lines.

As seen from FIG. 3, there is a considerable radial idle space between the wall of the bore 38 and the bolt 8', the purpose of which will be set forth more specifically hereinafter.

As seen, bushing or sleeve 13 has been dispensed within the present embodiment. In this embodiment, ear part 12a' is formed with an outwardly extending hollow cylindrical projection 12'c in the similar manner as before. In contact with the end extremity of this projection 12'c, seal ring 16' is positioned, so as to provide an effective seal between the ear and the bolt. For positioning this seal ring 16' in position, a retainer ring 39 is fixedly attached onto the end portion of said projection.

Similar sealing structure is embodied at the opposite side of the ear part 12a', as seen from FIG. 3.

The diameter of bore 38 is selected larger than the outer diameter of cylindrical projection 12'c.

With progress of the wear of pad 7', the caliper means 100' will gradually change its position rightwards in FIG. 3 relative to the ear 12a', thus the outer end of cylindrical projection advancing into the interior space of the bore 38 for compensation of the pad wear. In the present embodiment, this compensating job can be effectively realized.

In the present embodiment, ring grooves for mounting sealing rings 16 employed in the foregoing have been dispensed with. By adopting this feature, the slide guide bolts 8' can be strengthened so far, with equal diameter of the bolt. With this arrangement, dust seal means 18 can be dispensed with, on account of the more effective sealing operation provided by the seal rings positioned at the outer end extremities of the axially extending projecting cylinders 12'c or so formed on each of the ears 12a'.

Figure 5:
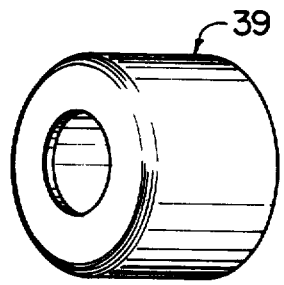
FIGS. 5 and 6 are enlarged perspective views of two constituent members employed in the second embodiment, respectively.
Figure 6:
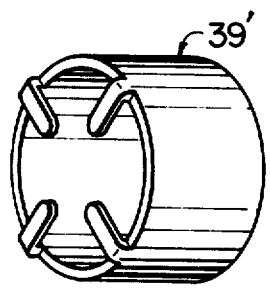

In FIG. 5, the retainer ring 39 is shown in its perspective view. In FIG. 6, a modification of this retainer ring is shown at 39' in its perspective view.

The general operation of the present embodiment is similar to that of the first embodiment and thus a further analysis thereof would not be necessary for better understanding of the present embodiment.

As a conclusion, the inventive mechanism can provide the following advantages:

1. By the provision of the high viscous liquid damper between the movable clamping means and the stationary supporting means such as arm 12, the high frequency vibration energy of the former means can be effectively suppressed. A sudden and severe collision of the frictional pads against the disk in non-braking period can be substantially avoided. In addition, wear of tie bolts 8 can be reduced to a possible minimum (first embodiment).

2. Clogging of the resilient rings 16 may substantially be avoided. The liquid damping means are provided at the innermost part of the brake unit and thus liable to be subjected to mechanical damage by collision of impinging stone particles coming from the road surface when the vehicle is running. In this respect, substantially, a full protection is provided for a long durable use of the brake unit (first embodiment).

3. The disadvantageous lateral bending moment acting upon the tie- or slide guide bolts can effectively be minimized in its adverse effect only by increasing the distance delta (both embodiments).

4. The stress-bearing members acting during the braking period and served by the tie- or similar bolts are utilized at the same time as the guide means for the movable clamping means so that the overall structure may be rather simplified and compacted over the conventional one. Especially, the horizontal length of the unit as measured in FIG. 2 can be shortened substantially over the comparative conventional units. In the case of the second embodiment, this length can be further reduced by at least 10% in comparison with the first embodiment, by the specifically selected positioning of seal means 16'.

The embodiments of the invention in which an exclusive property or privilege is claimed are as follows:

1. A disk type vehicle wheel brake unit comprising:
   a. stationary support plate means having a main part formed with a pair of ear portions each having a substantially T-shaped cross-section;
   b. aperture means extending through each of said ear portions;
   c. a circular opening formed through said main part in spaced relation to said ears;
   d. C-shaped caliper means disposed in straddling relation to said main part and both of said ear portions and comprising first and second legs with actuator means disposed in said first legs;
   e. tie bolt means secured to said legs and extending through said aperture means for sliding movement relative to said support plate means;
   f. a pair of spaced apart resilient seals disposed between said tie bolt means and said aperture means;
   g. a first friction pad stationarily mounted on said second leg;
   h. a second friction pad slidably mounted in said circular openings for enegagement by said actuator means;
   i. said pair of tie bolt means extending parallel to the axis of said circular opening and having at least a portion thereof positioned inside of the outline of said circular opening as defined by two parallel lines tangent to opposite sides of said opening to act as a tension means opposed against an expanding force applied to said caliper means during brake application;
   j. said caliper means acting as a compression means opposed against an expanding force developing in said caliper means during brake application; and
   k. said ear portions, tie bolt means and said resilient seals being positioned in a substantially enclosed space defined by said C-shaped calliper means and said friction pads.

2. A disk type vehicle wheel brake unit as set forth in claim 1 wherein a portion of said T-shaped ear portion extends into substantial overlapping relation to said first friction pad.

3. A disk type vehicle wheel brake unit as set forth in claim 1 wherein said C-shaped caliper means is constructed as one piece with a first leg portion having a cylinder having a piston slidably disposed therein and a second leg portion having an opening with a diameter larger than the outer diameter of said piston for introducing said piston into said cylinder and for dismantling said piston from said cylinder through said opening.

4. A disk type vehicle wheel brake unit as set forth in claim 3 wherein the caliper means is formed at an upper part of one of its legs with a horizontal bore having a larger diameter than the outer diameter of a cylindrical projection formed on one of the ear portions of said main part for allowing said cylindrical projection to advance into said bore upon increased wear of said pads.

5. A disk type vehicle wheel brake unit as set forth in claim 4 wherein sealing means is provided by a retainer ring fitted at an end extremity of said cylindrical projection for providing a seal between said bolt and said cylindrical projection.

* * * * *